(12) United States Patent
Suzuki et al.

(10) Patent No.: US 9,998,057 B2
(45) Date of Patent: Jun. 12, 2018

(54) POWER SUPPLY SYSTEM

(71) Applicant: Toyota Jidosha Kabushiki Kaisha, Toyota-shi, Aichi-ken (JP)

(72) Inventors: Kota Suzuki, Toyota (JP); Tomoko Oba, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days. days.

(21) Appl. No.: 15/470,022

(22) Filed: Mar. 27, 2017

(65) Prior Publication Data
US 2017/0288593 A1 Oct. 5, 2017

(30) Foreign Application Priority Data

Mar. 31, 2016 (JP) ................. 2016-070379

(51) Int. Cl.
| | |
|---|---|
| *B60L 1/00* | (2006.01) |
| *B60L 3/00* | (2006.01) |
| *H02G 3/00* | (2006.01) |
| *H02P 27/08* | (2006.01) |
| *H02M 1/08* | (2006.01) |
| *H02M 1/32* | (2007.01) |
| *H02M 7/539* | (2006.01) |
| *H02P 25/03* | (2016.01) |

(52) U.S. Cl.
CPC .............. *H02P 27/08* (2013.01); *H02M 1/08* (2013.01); *H02M 1/32* (2013.01); *H02M 7/539* (2013.01); *H02M 2001/327* (2013.01); *H02P 25/03* (2016.02)

(58) Field of Classification Search
CPC ...... B60L 11/1868; H02P 27/08; H02P 25/03; H02P 23/0004; H02M 7/539; H02M 7/217; H02M 1/08; H02M 1/32; H02M 2001/327; H02M 3/1563
USPC .................. 307/10.1, 9.1; 323/222; 363/132; 701/22
See application file for complete search history.

(56) References Cited

U.S. PATENT DOCUMENTS

| | | | | |
|---|---|---|---|---|
| 4,661,764 A | * | 4/1987 | Mostyn ............... | H02M 3/1563 323/222 |
| 7,577,008 B2 | * | 8/2009 | Hiller .................... | H02M 7/217 363/132 |

(Continued)

FOREIGN PATENT DOCUMENTS

JP 2009060726 A 3/2009

*Primary Examiner* — Rexford Barnie
*Assistant Examiner* — Jagdeep Dhillon
(74) *Attorney, Agent, or Firm* — Dinsmore & Shohl LLP

(57) ABSTRACT

A converter includes one chip constituted a switching device and a diode. An electronic control unit is configured to calculate a temperature estimated value of the switching device from control conditions of the converter, restrict a control upper-limit value of charge power or discharge power of a battery, when a detection value of a temperature sensor is higher than the temperature estimated value of the switching device, and the detection value of the temperature sensor exceeds a protection temperature of the diode, and restrict a control upper-limit value of charge power or discharge power of the battery, when the detection value of the temperature sensor is lower than the temperature estimated value of the switching device, and the detection value of the temperature sensor exceeds a protection temperature of the switching device.

6 Claims, 6 Drawing Sheets

(56) References Cited

U.S. PATENT DOCUMENTS

| | | | | |
|---|---|---|---|---|
| 8,220,574 | B2* | 7/2012 | Nozawa | H02M 7/53873 180/65.21 |
| 2010/0270955 | A1* | 10/2010 | Yamakawa | H02P 23/0004 318/139 |
| 2010/0318250 | A1* | 12/2010 | Mitsutani | B60K 1/02 701/22 |
| 2013/0063061 | A1* | 3/2013 | Hanada | H02P 27/08 318/400.14 |
| 2014/0062350 | A1* | 3/2014 | Han | H02P 21/10 318/139 |
| 2014/0062352 | A1* | 3/2014 | Wang | A01D 34/78 318/139 |
| 2015/0298568 | A1* | 10/2015 | Mitsutani | B60L 11/1868 307/9.1 |
| 2015/0360579 | A1* | 12/2015 | Hashimoto | B60L 11/1868 307/10.1 |
| 2016/0152150 | A1* | 6/2016 | Taguchi | B60L 11/1803 307/10.1 |

\* cited by examiner

<DURING REGENERATIVE OPERATION OF MG (DURING BATTERY CHARGE)>

SWITCHING AT GIVEN INTERVALS

POWER SUPPLY SYSTEM

CROSS-REFERENCE TO RELATED APPLICATIONS

This application claims priority to Japanese Patent Application No. 2016-070379 filed on Mar. 31, 2016 which is incorporated herein by reference in its entirety including the specification, drawings and abstract.

BACKGROUND

1. Technical Field

The disclosure relates to a technology for suppressing overheating of a converter installed on a power supply system.

2. Description of Related Art

A power supply system that supplies electric power to an inverter (load) installed on a vehicle is disclosed in Japanese Patent Application Publication No. 2009-60726 (JP 2009-60726 A). This power supply system includes a battery, a first positive line connected to a positive terminal of the battery, a second positive line connected to a positive terminal of the inverter, a negative line connected between a negative terminal of the inverter and a negative terminal of the battery, and a converter that performs voltage conversion between the battery and the inverter. The converter includes an upper arm and a lower arm connected in series between the second positive line and the negative line, a connection node connected to the upper arm, lower arm, and the first positive line, and a reactor provided on the first positive line. Each of the upper arm and the lower arm includes an IGBT (Insulated Gate Bipolar Transistor) device, and a diode that is connected in antiparallel with the IGBT device.

SUMMARY

In the power supply system disclosed in JP 2009-60726 A, when electric current flows through each part (each IGBT device and each diode) of the converter in accordance with charge/discharge of the battery, heat is generated in the part. The amount of heat generation of each part differs depending on control conditions (such as the amount of current passing through the part, boosting ratio, and the switching frequency). Accordingly, in order to appropriately suppress overheating of each part, it is desirable to detect the temperature of each part by means of a temperature sensor, and restrict charge/discharge of the battery so that the temperature of each part does not exceed a corresponding permissible temperature.

However, in the case where the IGBT device and the diode are integrated into one chip, to provide a reverse-conducting IGBT (which will also be referred to as "RCIGBT" (Reverse-Conducting Insulated Gate Bipolar Transistor)) that is employed as the upper arm of the converter, even if the temperature of the upper arm is detected by a temperature sensor, it is difficult to determine which of the IGBT device and the diode generates heat that has a greater influence on the detection value of the temperature sensor. Therefore, it cannot be determined whether control for curbing heat generation of the IGBT device should be performed, or control for curbing heat generation should be performed, and overheating of the upper arm may not be appropriately suppressed. A similar problem arises in the case where the RCIGBT is employed as the lower arm of the converter.

This disclosure provides a power supply system in which overheating of RCIGBT is appropriately suppressed, in the case where RCIGBTs each having a switching device (IGBT device) and a diode that constitute one chip are employed as upper arm and lower arm of a converter.

A power supply system configured to supply electric power to a load according to an aspect of the present disclosure includes a battery, a first positive line connected to a positive electrode of the battery, a second positive line connected to a positive terminal of the load, a negative line connected between a negative terminal of the load and a negative electrode of the battery, a converter configured to perform voltage conversion between the battery and the load, the converter including a first switching device and a second switching device connected in series between the second positive line and the negative line, such that the first switching device is located closer to the second positive line than the second switching device, and the second switching device is located closer to the negative line than the first switching device, a first diode connected in antiparallel with the first switching device, the first switching device and the first diode constituting one chip, a second diode connected in antiparallel with the second switching device, a connection node connected to the first switching device, the second switching device, and the first positive line, and a reactor provided on the first positive line or on the negative line between the second switching device and the negative electrode of the battery, a temperature sensor configured to detect a temperature of the chip, and an electronic control unit configured to i) calculate a temperature estimated value of the first switching device from control conditions of the converter, ii) restrict a control upper-limit value of discharge power of the battery, when a detection value of the temperature sensor is higher than the temperature estimated value of the first switching device, and the detection value of the temperature sensor exceeds a protection temperature of the first diode, and iii) restrict a control upper-limit value of charge power of the battery, when the detection value of the temperature sensor is lower than the temperature estimated value of the first switching device, and the detection value of the temperature sensor exceeds a protection temperature of the first switching device.

With the above arrangement, the first switching device and the first diode included in the upper arm of the converter constitute one chip. When the detection value of the temperature sensor that detects the temperature of the chip is higher than the estimated value of the temperature of the first switching device, it is assumed that the amount of heat generation of the first diode is larger than that of the first switching device, and the detection value of the temperature sensor indicates a value close to the temperature of the first diode. Therefore, the electronic control unit restricts the control upper-limit value of discharge power of the battery when the detection value of the temperature sensor exceeds the protection temperature of the first diode. Thus, the amount of current passing through the first diode is reduced, so that heat generation of the first diode is curbed.

On the other hand, when the detection value of the temperature sensor is lower than the estimated value of the temperature of the first switching device, it is assumed that the amount of heat generation of the first switching device is larger than that of the first diode, and the detection value of the temperature sensor indicates a value close to the temperature of the first switching device. Therefore, the electronic control unit restricts the control upper-limit value of charge power of the battery when the detection value of the temperature sensor exceeds the protection temperature of the first switching device. Thus, the amount of current passing through the first switching device is reduced, so that heat generation of the first switching device is curbed.

Consequently, when the RCIGBT is employed as the upper arm of the converter, overheating of the RCIGBT can be appropriately suppressed.

A power supply system configured to supply electric power to a load according to an aspect of the present disclosure includes a battery, a first positive line connected to a positive electrode of the battery, a second positive line connected to a positive terminal of the load, a negative line connected between a negative terminal of the load and a negative electrode of the battery, a converter configured to perform voltage conversion between the battery and the load, the converter including a first switching device and a second switching device connected in series between the second positive line and the negative line, such that the first switching device is located closer to the second positive line than the second switching device, and the second switching device is located closer to the negative line than the first switching device, a first diode connected in antiparallel with the first switching device, the first switching device and the first diode constituting one chip, a second diode connected in antiparallel with the second switching device, the second switching device and the second diode constituting one chip, a connection node connected to the first switching device, the second switching device, and the first positive line, a reactor provided on the first positive line or on the negative line between the second switching device and the negative electrode of the battery, a temperature sensor configured to detect a temperature of the chip, and an electronic control unit configured to i) calculate a temperature estimated value of the second switching device from control conditions of the converter, ii) restrict a control upper-limit value of charge power of the battery, when a detection value of the temperature sensor is higher than the temperature estimated value of the second switching device, and the detection value of the temperature sensor exceeds a protection temperature of the second diode, and iii) restrict a control upper-limit value of discharge power of the battery, when the detection value of the temperature sensor is lower than the temperature estimated value of the second switching device, and the detection value of the temperature sensor exceeds a protection temperature of the second switching device.

With the above arrangement, the second switching device and the second diode included in the lower arm of the converter constitute one chip. When the detection value of the temperature sensor that detects the temperature of the chip is higher than the estimated value of the temperature of the second switching device, it is assumed that the amount of heat generation of the second diode is larger than that of the second switching device, and the detection value of the temperature sensor indicates a value close to the temperature of the second diode. Therefore, the electronic control unit restricts the control upper-limit value of charge power of the battery when the detection value of the temperature sensor exceeds the protection temperature of the second diode. Thus, the amount of current passing through the second diode is reduced, so that heat generation of the second diode is curbed.

On the other hand, when the detection value of the temperature sensor is equal to or lower than the estimated value of the temperature of the second switching device, it is assumed that the amount of heat generation of the second switching device is larger than that of the second diode, and the detection value of the temperature sensor indicates a value close to the temperature of the second switching device. Therefore, the electronic control unit restricts the control upper-limit value of discharge power of the battery when the detection value of the temperature sensor exceeds the protection temperature of the second switching device. Thus, the amount of current passing through the second switching device is reduced, so that heat generation of the second switching device is curbed.

Consequently, when the RCIGBT is employed as the lower arm of the converter, overheating of the RCIGBT can be appropriately suppressed.

A power supply system configured to supply electric power to a load according to an aspect of the present disclosure includes a battery, a converter configured to perform voltage conversion between the battery and the load, the converter including a switching device, a diode connected in antiparallel with the switching device, the switching device and the diode constituting one chip, a temperature sensor configured to detect a temperature of the chip, and an electronic control unit configured to i) calculate a temperature estimated value of the switching device from control conditions of the converter, ii) restrict a control upper-limit value of charge power or discharge power of the battery, when a detection value of the temperature sensor is higher than the temperature estimated value of the switching device, and the detection value of the temperature sensor exceeds a protection temperature of the diode, and iii) restrict a control upper-limit value of charge power or discharge power of the battery, when the detection value of the temperature sensor is lower than the temperature estimated value of the switching device, and the detection value of the temperature sensor exceeds a protection temperature of the switching device.

With the above arrangement, heat generation of the diode and the switching device is curbed. Consequently, when the RCIGBT is employed the converter, overheating of the RCIGBT can be appropriately suppressed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
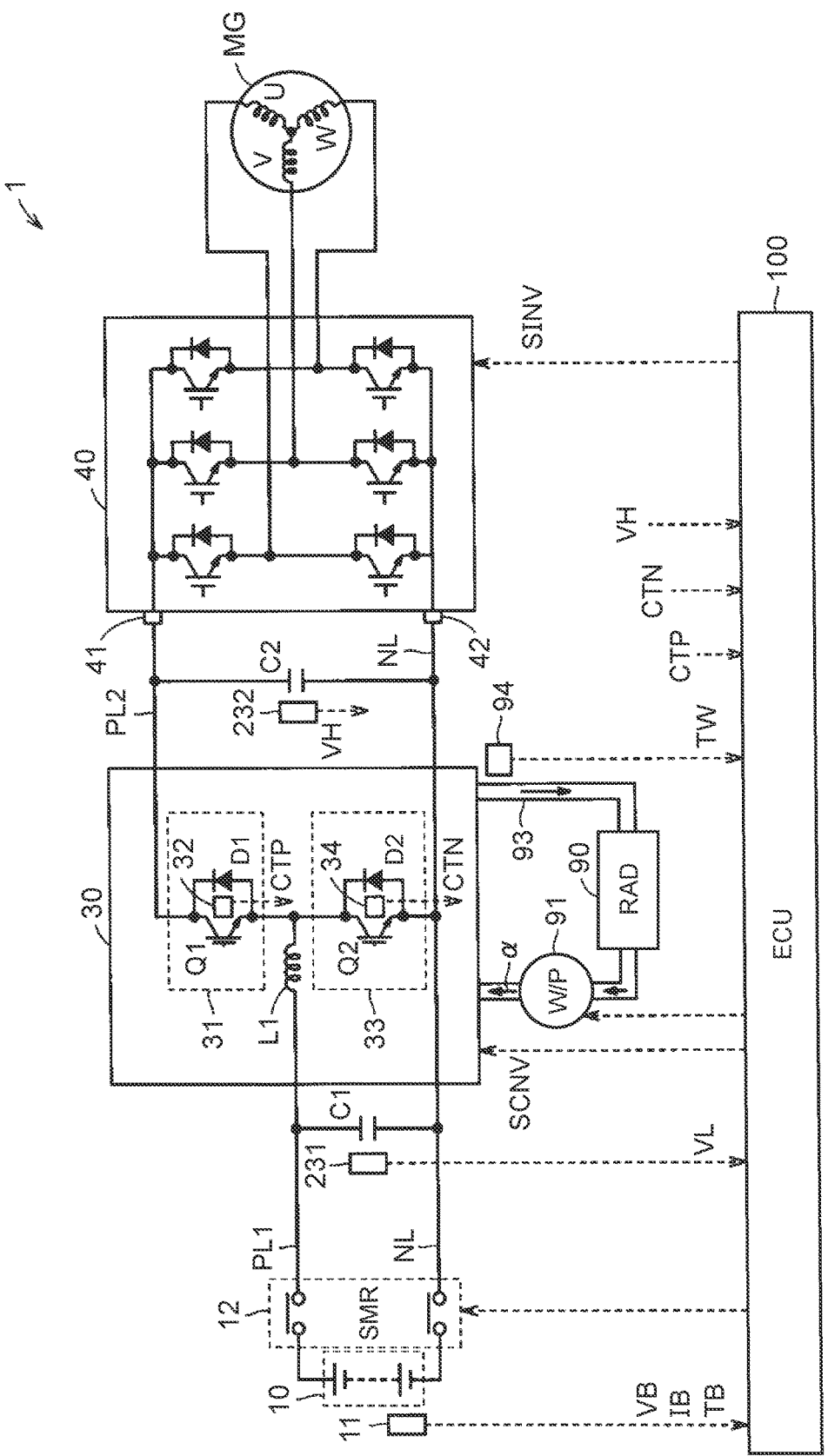
FIG. 1 is a view generally showing the overall configuration of a vehicle including a power supply system.

One embodiment of the disclosure will be described in detail with reference to the drawings. In the drawings, the same reference numerals are assigned to the same or corresponding portions or components, of which explanation will not be repeated.

FIG. 1 generally shows the overall configuration of a vehicle 1 including a power supply system according to the embodiment. The vehicle 1 includes a motor-generator MG, an inverter 40 (load) for driving the motor-generator MG, and the power supply system for supplying DC power to the inverter 40.

The power supply system includes a battery 10, a system main relay (SMR) 12, a converter 30, positive lines PL1, PL2, a negative line NL, capacitors C1, C2, voltage sensors 231, 232, and an electronic control unit (ECU) 100.

The positive line PL1 is connected between a positive electrode of the battery 10 and the converter 30. The positive line PL2 is connected between a positive terminal 41 of the inverter 40 and the converter 30. The negative line NL is connected between a negative terminal 42 of the inverter 40 and a negative electrode of the battery 10.

The battery 10 is a rechargeable secondary battery. The battery 10 stores electric power for driving the motor-generator MG. The battery 10 is provided with a monitoring unit 11. The monitoring unit 11 detects the voltage (battery voltage) VB of the battery 10, current (battery current) IB flowing through the battery 10, and the temperature (battery temperature) TB of the battery 10, and outputs the detection results to the ECU 100.

The SMR 12 is provided between the battery 10 and the converter 30, and switches between a position for connecting the battery 10 with the converter 30 and a position for disconnecting the battery 10 from the converter 30, according to a control signal from the ECU 100. The SMR 12 includes a positive relay that cuts off the positive line PL1, and a negative relay that cuts off the negative line NL between the converter 30 and the battery 10.

The capacitor C1 is connected between the positive line PL1 and the negative line NL, and smoothes the voltage VL between the positive line PL1 and the negative line NL. The voltage sensor 231 detects the voltage VL across the opposite ends of the capacitor C1.

The capacitor C2 is connected between the positive line PL2 and the negative line NL, and smoothes the voltage VH between the positive line PL2 and the negative line NL. The voltage sensor 232 detects the voltage VH across the opposite ends of the capacitor C2.

The converter 30 includes an upper arm 31, a lower arm 33, and a reactor L1. The upper arm 31 and the lower arm 33 are connected in series in this order, between the positive line PL2 and the negative line NL. The reactor L1 is provided on the positive line PL1 that connects a connection node between the upper arm 31 and the lower arm 33, with the positive electrode of the battery 10. The reactor L1 may be provided on the negative line NL between the lower arm 33 and the negative electrode of the battery 10, rather than on the positive line PL1.

The upper arm 31 includes an IGBT device Q1 as a switching device, and a diode (flywheel diode) D1 connected in antiparallel or inverse parallel between collector and emitter of the IGBT device Q1. The lower arm 33 includes an IGBT (Insulated Gate Bipolar Transistor) device Q2, and a diode (flywheel diode) D2 connected in antiparallel or inverse parallel between collector and emitter of the IGBT device Q2.

The upper arm 31 is a RCIGBT in which the IGBT device Q1 and the diode D1 are integrated into one chip. The lower arm 33 is a RCIGBT in which the IGBT device Q2 and the diode D2 are integrated into one chip.

The upper arm 31 and the lower arm 33 are respectively provided with temperature sensors 32, 34. The temperature sensor 32 detects the temperature in the chip of the upper arm 31 (which will also be called "upper arm temperature CTP"). The temperature sensor 34 detects the temperature in the chip of the lower arm 33 (which will also be called "lower arm temperature CTN"). The temperature sensors 32, 34 output the respective detection results to the ECU 100.

In the following, the upper arm temperature CTP detected by the temperature sensor 32 will be simply referred to as "CPT detection value", and the lower arm temperature CTN detected by the temperature sensor 34 will be simply referred to as "CTN detection value".

The converter 30 performs switching operation according to a control signal SCNV from the ECU 100, so as to make the voltage VH equal to or higher than the voltage VL.

The motor-generator MG is a permanent magnet type three-phase AC synchronous motor. The motor-generator MG is driven by electric current supplied from the inverter 40. The vehicle 1 travels with power of the motor-generator MG transmitted to drive wheels (not shown). The vehicle 1 may be a hybrid vehicle including an engine as a drive source, in addition to the motor-generator.

The inverter 40 is a so-called three-phase inverter. The inverter 40 performs switching operation according to a control signal SINV from the ECU 100, so as to perform power conversion between the motor-generator MG and the converter 30.

The vehicle 1 further includes a radiator 90, a water pump 91, a water channel 93, and a water temperature sensor 94, as an arrangement for cooling the interior of the converter 30. The interior of the converter 30, radiator 90, and the water pump 91 are circularly connected in series by the water channel 93. The water pump 91 circulates cooling water in a direction of arrow a shown in FIG. 1, when it is operated according to a control signal from the ECU 100. The radiator 90 receives the cooling water that has cooled the devices in the converter 30, from the water channel 93, and cools the cooling water by heat exchange between the cooling water received from the water channel 93 and air. The water temperature sensor 94 detects the temperature (which will also be called "coolant temperature TW") of the cooling water flowing through the water channel 93, and outputs the detection result to the ECU 100.

The ECU 100 incorporates CPU (Central Processing Unit) and a memory (not shown), and controls each equipment of the vehicle 1, based on the detection result of each sensor and information stored in the memory, for example.

For example, the ECU 100 sets a control upper-limit value of charge power of the battery 10 (which will also be referred to as "charge power upper-limit value WIN"), based on the SOC (State Of Charge) of the battery 10, the battery temperature TB, etc. The ECU 100 controls the converter 30 and the inverter 40, so that the charge power supplied to the battery 10 does not exceed the charge power upper-limit value WIN. Similarly, the ECU 100 sets a control upper-limit value of discharge power of the battery 10 (which will also be referred to as "discharge power upper-limit value WOUT"), based on the SOC of the battery 10, the battery temperature TB, etc. The ECU 100 controls the converter 30 and the inverter 40, so that the discharge power delivered from the battery 10 does not exceed the discharge power upper-limit value WOUT.

Figure 2:
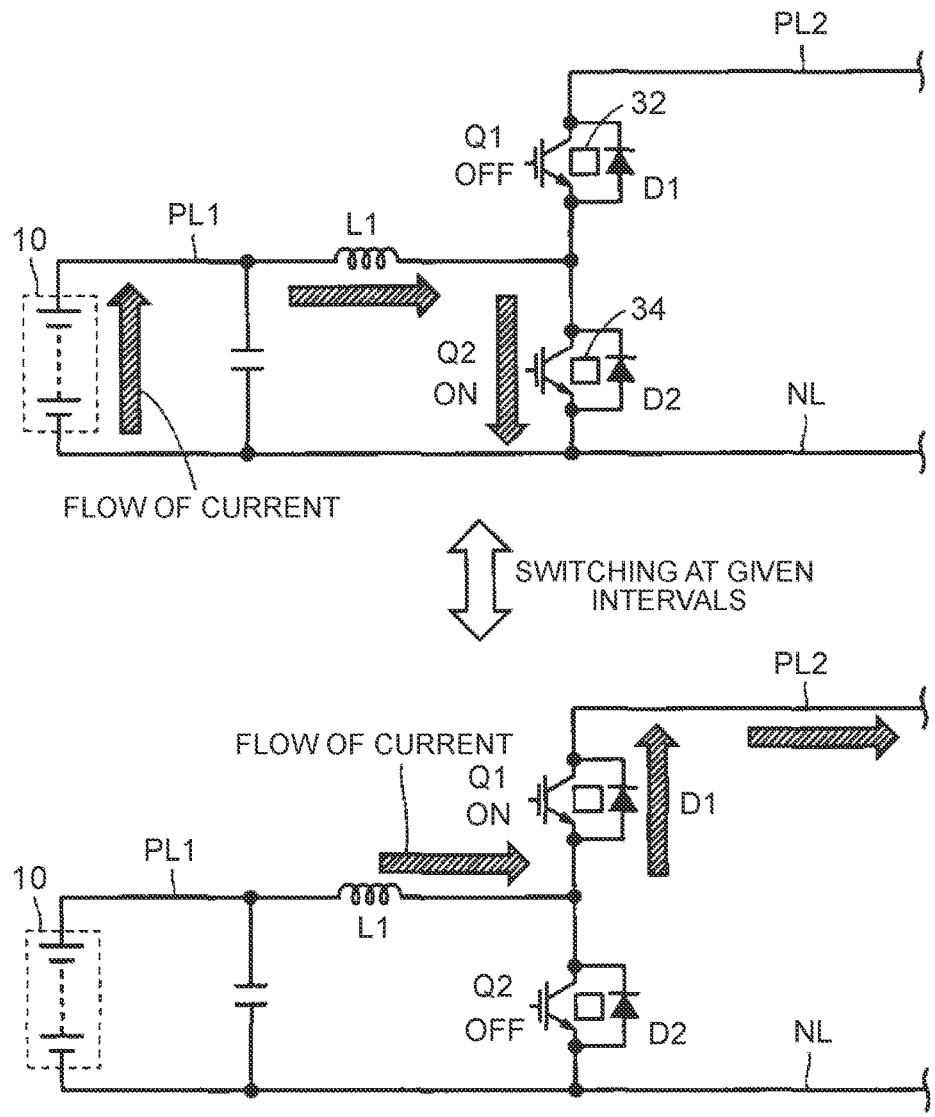
FIG. 2 is a view schematically showing switching operation of a converter and flow of electric current during power running of a motor-generator (during discharging of a battery)

FIG. 2 schematically shows switching operation of the converter 30 and flow of electric current during power running of the motor-generator MG (i.e., during discharging of the battery 10). The upper view of FIG. 2 shows a condition where the IGBT device Q1 is placed in an OFF state (non-conducting state), and the IGBT device Q2 is placed in an ON state (conducting state). The lower view of FIG. 2 shows a condition where the IGBT device Q1 is in the ON state, and the IGBT device Q2 is in the OFF state.

In the condition shown in the upper view of FIG. 2, a closed circuit including the battery 10, reactor L1, and the IGBT device Q2 is formed, and discharge current of the battery 10 flows through the reactor L1 and the IGBT device Q2. With this current, energy is stored in the reactor L1.

When the converter 30 switches from the condition shown in the upper view of FIG. 2 to the condition shown in the lower view of FIG. 2, the closed circuit formed in the condition of the upper view of FIG. 2 is cut off, and no current is generated from the battery 10. However, the reactor L1 releases the stored energy, so as to keep current flowing in the discharging direction due to the self-induction effect. As a result, current flows from the reactor L1 to the positive line PL2 through the diode D1. With this current, the motor-generator MG is driven.

The ECU 100 switches the converter 30 between the condition shown in the upper view of FIG. 2, and the condition shown in the lower view of FIG. 2, at intervals according to a given switching frequency, during power running of the motor-generator MG (during discharging of the battery 10). In the case where the ECU 100 performs PWM (Pulse Width Modulation) control on the converter 30, the above switching frequency corresponds to the carrier frequency.

As shown in the upper view of FIG. 2 and the lower view of FIG. 2 as described above, current flows through the diode D1 of the upper arm and the IGBT device Q2 of the lower arm, during power running of the motor-generator MG (during discharging of the battery 10). Accordingly, in order to curb heat generation of the diode D1 of the upper arm and heat generation of the IGBT device Q2 of the lower arm, it is effective to suppress or reduce discharge current of the battery 10.

Figure 3:
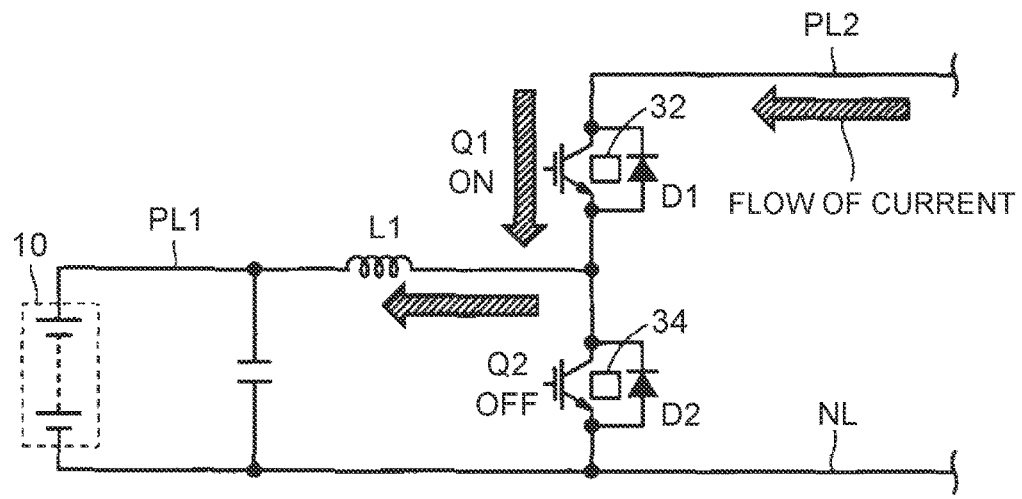
FIG. 3 is a view schematically showing switching operation of the converter and flow of electric current during regenerative operation of the motor-generator (during charging of the battery)
Figure 3:
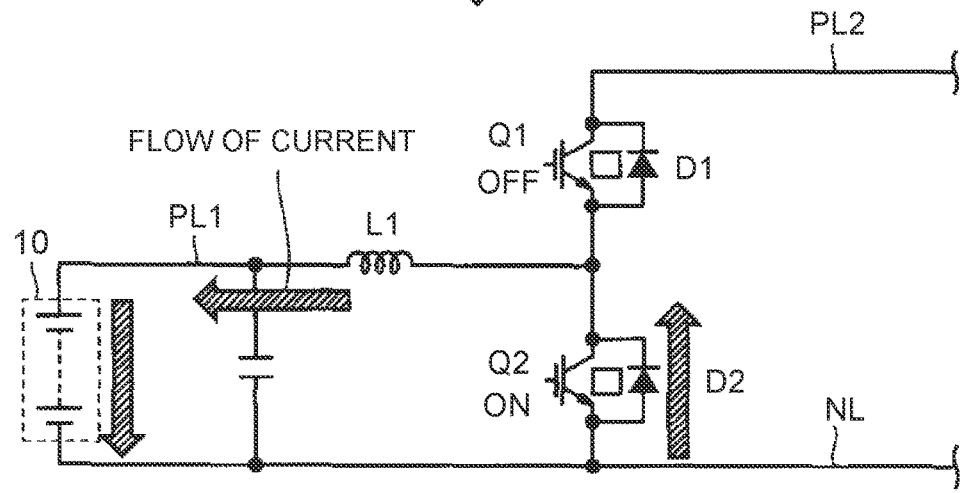

FIG. 3 schematically shows switching operation of the converter 30 and flow of electric current, during regenerative operation of the motor-generator MG (i.e., during charging of the battery 10). The upper view of FIG. 3 shows a condition where the IGBT device Q1 is in the ON state, and the IGBT device Q2 is in the OFF state. The lower view of FIG. 3 shows a condition where the IGBT device Q1 is in the OFF state, and the IGBT device Q2 is in the ON state.

In the condition shown in the upper view of FIG. 3, regenerative current of the motor-generator MG flows from the positive line PL2 into the reactor L1 through the IGBT device Q1. With this current, energy is stored in the reactor L1.

When the converter 30 switches from the condition shown in the upper view of FIG. 3 to the condition shown in the lower view of FIG. 3, flow of current from the positive line PL2 to the reactor L1 is cut off by the diode D2, but the reactor L1 releases the stored energy, so as to keep current flowing in the regenerative direction due to the self-induction effect. As a result, current flows through a closed circuit including the battery 10, reactor L1, and the diode D2. With this current, the battery 10 is charged.

The ECU 100 switches the converter 30 between the condition shown in the upper view of FIG. 3, and the condition shown in the lower view of FIG. 3, at intervals according to a given switching frequency, during regenerative operation of the motor-generator MG (during charging of the battery 10). In the case where the ECU 100 performs PWM (Pulse Width Modulation) control on the converter 30, the above switching frequency corresponds to the carrier frequency.

As shown in the upper view of FIG. 3 and the lower view of FIG. 3 as described above, current flows through the IGBT device Q1 of the upper arm and the diode D2 of the lower arm, during regenerative operation of the motor-generator MG (during charging of the battery 10). Accordingly, in order to curb heat generation of the IGBT device Q1 of the upper arm and heat generation of the diode D2 of the lower arm, it is effective to suppress or reduce charge current of the battery 10.

In the vehicle 1 constructed as described above, when current flows through each part (the IGBT devices Q1, Q2 and the diodes D1, D2) of the converter 30 in association with charge/discharge of the battery 10, heat is generated in each part. The amount of heat generated in each part differs depending on the amount of current passing through the converter 30, the boosting ratio (VL/VH), the switching frequency (the number of times of switching per unit time), and the operating state (whether the motor-generator is operating in in power running mode or in regenerative mode), for example. Accordingly, in order to appropriately suppress overheating of each part of the converter 30, it is desirable to detect the temperature of each part by a temperature sensor, and restrict charge/discharge of the battery 10 so that the temperature of each part does not exceed a corresponding permissible temperature.

In particular, when the upper arm 31 is protected from overheating, the direction of current to be restrained is reversed, between the case where heat generation of the IGBT device Q1 is curbed, and the case where heat generation of the diode D1 is curbed. Namely, as described above, it is effective to restrain charge current of the battery 10, so as to curb heat generation of the IGBT device Q1, whereas it is effective to restrain discharge current of the battery 10, so as to curb heat generation of the diode D1. Accordingly, in order to appropriately protect the upper arm 31 from overheating, it is desirable to determine which of the IGBT device Q1 and the diode D1 generates heat that should be suppressed, and decide the direction of the current to be restrained according to the result of the determination.

However, in this embodiment, the upper arm 31 is the RCIGBT, and the IGBT device Q1 and the diode D1 constitute one chip. Accordingly, the temperature sensor 32 is influenced by both heat from the IGBT device Q1 and heat from the diode D1. Therefore, it is difficult to determine, based on only the CTP detection value (the upper arm temperature CTP detected by the temperature sensor 32), which of the IGBT device Q1 and the diode D1 generates heat that has a greater influence on the CTP detection value, and the direction of the current to be restrained cannot be decided.

Similarly, when the lower arm 33 is protected from overheating, the direction of current to be restrained is reversed, between the case where heat generation of the IGBT device Q2 is curbed, and the case where heat generation of the diode D2 is curbed. Namely, as described above, it is effective to restrain discharge current of the battery 10, so as to curb heat generation of the IGBT device Q2, whereas it is effective to restrain charge current of the battery 10, so as to curb heat generation of the diode D2. Accordingly, in order to appropriately protect the lower arm 33 from overheating, it is desirable to determine which of the IGBT device Q2 and the diode D2 generates heat that should be suppressed, and decide the direction of the current to be restrained according to the result of the determination.

However, in this embodiment, the lower arm 33 is the RCIGBT, and the IGBT device Q2 and the diode D2 constitute one chip. Accordingly, it is difficult to determine, based on only the CTN detection value (the lower arm temperature CTN detected by the temperature sensor 34), which of the IGBT device Q2 and the diode D2 generates heat that has a greater influence on the CTN detection value, and the direction of the current to be restrained cannot be decided.

In view of the above points, when the ECU 100 according to this embodiment protects the upper arm 31 from overheating, it calculates an estimated temperature of the IGBT device Q1 (which will be simply referred to as "Q1 estimated temperature"), using control conditions of the converter 30 and the coolant temperature TW, and determines which of the amount of heat generation of the IGBT device Q1 and the amount of heat generation of the diode D1 is larger, by comparing the CTP detection value with the Q1 estimated temperature. Then, the ECU 100 determines whether to restrict charge of the battery 10 or restrict discharge of the battery 10, according to the result of the above determination. Thus, overheating of the upper arm 31 is appropriately suppressed.

The ECU 100 protects the lower arm 33 from overheating, in the same manner as is the case with the upper arm 31. Namely, in the case where the ECU 100 protects the lower arm 33 from overheating, it calculates an estimated temperature of the IGBT device Q2 (which will be simply referred to as "Q2 estimated temperature"), using control conditions of the converter 30 and the coolant temperature TW, and determines which of the amount of heat generation of the IGBT device Q2 and the amount of heat generation of the diode D2 is larger, by comparing the CTN detection value with the Q2 estimated temperature. Then, the ECU 100 determines whether to restrict discharge of the battery 10 or restrict charge of the battery 10, according to the result of the above determination. Thus, overheating of the lower arm 33 is appropriately suppressed.

Figure 4:
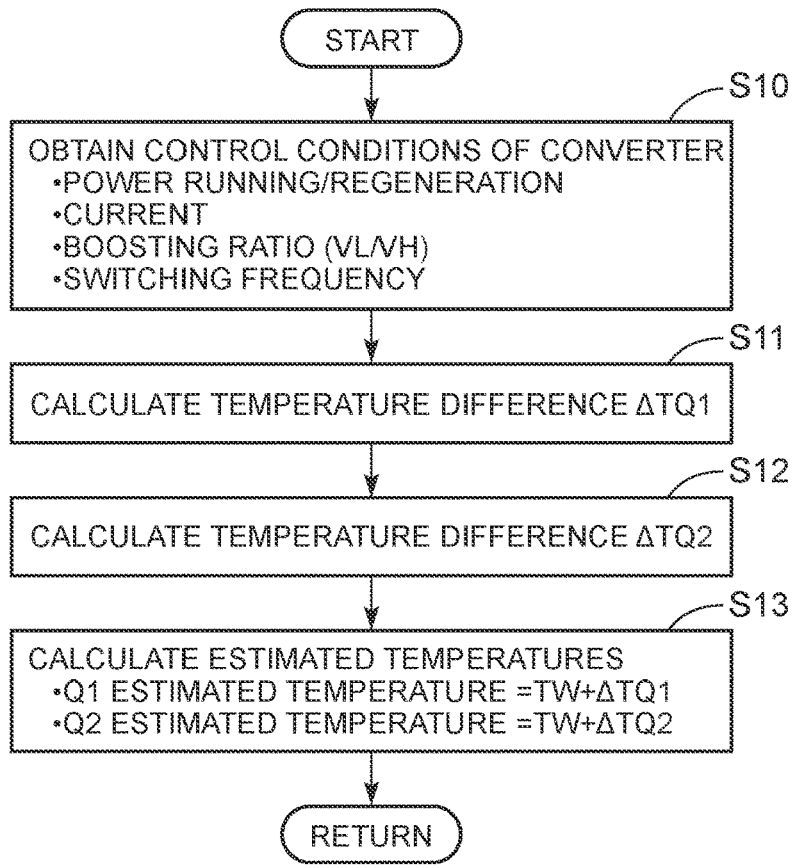
FIG. 4 is a flowchart illustrating one example of a control routine of an electronic control unit (ECU)

FIG. 4 is a flowchart illustrating one example of a control routine executed by the ECU 100 when it calculates the Q1 estimated temperature and the Q2 estimated temperature. The routine of this flowchart is repeatedly executed at given intervals.

In step S10, the ECU 100 obtains information indicating control conditions of the converter 30. More specifically, the ECU 100 obtains information indicating whether the motor-generator MG is in power running mode (the battery is discharging power, see FIG. 2), or the motor-generator MG is in regenerative mode (the battery is being charged, see FIG. 3), current flowing through the converter 30 (battery current IB), boosting ratio (the ratio of voltage VL to voltage VH), and the switching frequency (the number of times of switching per unit time).

The items of information obtained in step S10 are parameters that influence the amounts of heat generation of the IGBT devices Q1, Q2. In the IGBT devices Q1, Q2, there exist heat loss (Joule heat loss) due to passage of electric current, heat loss due to the boosting ratio, and heat loss due to switching.

Figure 5:
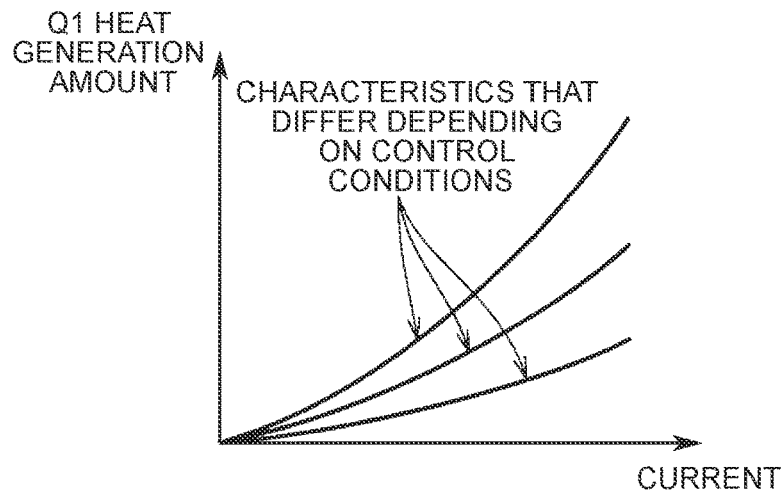
FIG. 5 is a view schematically showing one example of the correspondence relationship between current flowing through an Insulated Gate Bipolar Transistor (IGBT) device of an upper arm and the amount of temperature rise of the IGBT device.
Figure 6:
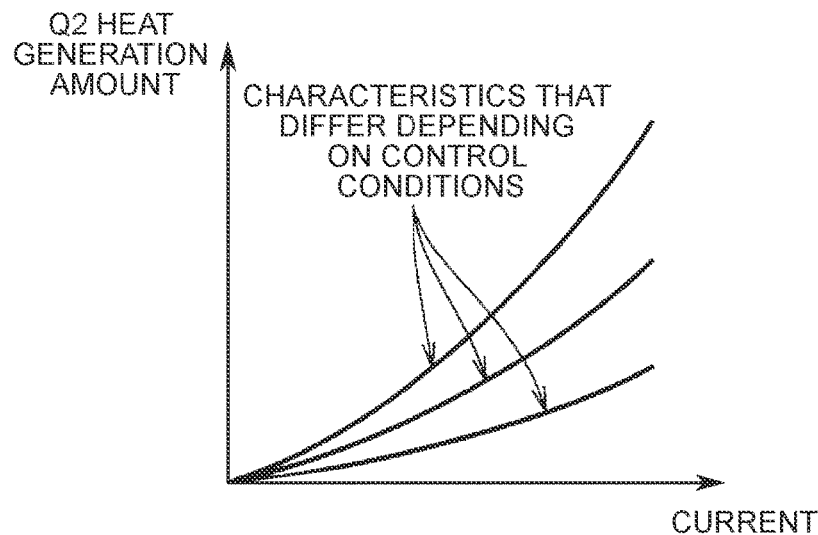
FIG. 6 is a view schematically showing one example of the correspondence relationship between current flowing through an IGBT device of a lower arm and the amount of temperature rise of the IGBT device.

FIG. 5 schematically shows one example of the correspondence relationship between the current flowing through the IGBT device Q1, and the amount of heat generation of the IGBT device Q1. FIG. 6 schematically shows one example of the correspondence relationship between the current flowing through the IGBT device Q2 and the amount of heat generation of the IGBT device Q2. As shown in FIG. 5 and FIG. 6, the heat loss (Joule heat loss) due to passage of current increases and each of the amounts of heat generation of the IGBT devices Q1, Q2 increases as the current is larger; however, even if the same current flows, each of the amounts of heat generation assumes different values, depending on other control conditions, such as the boosting ratio and the switching frequency. The ECU 100 stores the correspondence relationships as shown in FIGS. 5, 6, which are obtained by experiment, or the like, in the memory in advance.

In step S11, the ECU 100 calculates a temperature difference $\Delta TQ1$ between the temperature of the IGBT device Q1 and the coolant temperature TW, using the information obtained in step S10. The ECU 100 reads the correspondence relationship shown in FIG. 5 from the memory, and calculates the amount of heat generation of the IGBT device Q1 corresponding to the information obtained in step S10, with reference to the map. Then, the ECU 100 calculates the temperature difference $\Delta TQ1$, in view of the history of the amount of heat generation of the IGBT device Q1 and an influence of the passage of time. Namely, while the IGBT device Q1 is cooled by the cooling water, the heat capacity of the cooling water is considerably smaller than the heat capacity of the IGBT device Q1, and the temperature of the IGBT device Q1 becomes equal to the coolant temperature TW by a given time constant. In view of this point, the ECU 100 calculates the temperature difference $\Delta TQ1$.

In step S12, the ECU 100 calculates a temperature difference $\Delta TQ2$ between the temperature of the IGBT device Q2 and the coolant temperature TW, using the information obtained in step S10. The ECU 100 reads the correspondence relationship shown in FIG. 6 from the memory, and calculates the amount of heat generation of the IGBT device Q2 corresponding to the information obtained in step S10, with reference to the map. Then, the ECU 100 calculates the temperature difference $\Delta TQ2$, in view of the history of the amount of heat generation of the IGBT device Q2 and an influence of the passage of time. Namely, like the temperature of the IGBT device Q1, the temperature of the IGBT device Q2 also becomes equal to the coolant temperature TW by a given time constant. In view of this point, the ECU 100 calculates the temperature difference $\Delta TQ2$.

In step S13, the ECU 100 substitutes the coolant temperature TW detected by the water temperature sensor 94 and the temperature differences $\Delta TQ1$, $\Delta TQ2$ calculated in steps S11 and S12, into Eq. (1) and Eq. (2) below, so as to calculate the Q1 estimated temperature and the Q2 estimated temperature, and store the results of calculation in the memory.

$$Q1 \text{ estimated temperature} = \text{coolant temperature } TW + \text{temperature difference } \Delta TQ1 \quad (1)$$

$$Q2 \text{ estimated temperature} = \text{coolant temperature } TW + \text{temperature difference } \Delta TQ2 \quad (2)$$

Figure 7:
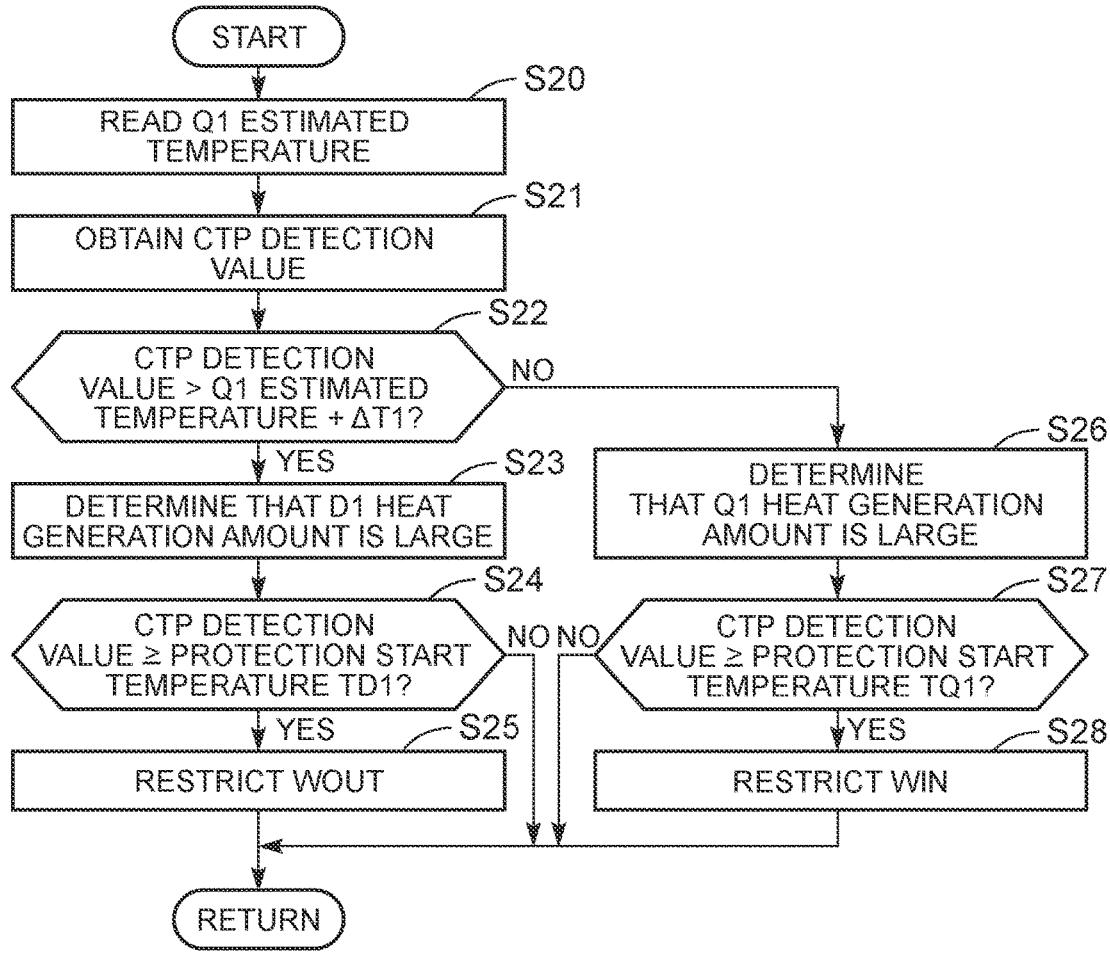
FIG. 7 is a flowchart illustrating one example of a control routine of the ECU.

FIG. 7 is a flowchart illustrating a control routine executed by the ECU 100 when it protects the upper arm 31 of the converter 30 from overheating. The routine of this flowchart is repeatedly executed at given intervals.

In step S20, the ECU 100 reads the Q1 estimated temperature calculated and stored in step S13 of FIG. 4 as described above, from the memory. In step S21, the ECU 100 obtains the CTP detection value from the temperature sensor 32.

In step S22, the ECU 100 determines whether the CTP detection value is higher than the Q1 estimated temperature. In this embodiment, it is determined whether the CTP detection value is higher than a value obtained by adding a given margin $\Delta T1$ to the Q1 estimated temperature, in view of an error of the Q1 estimated temperature, for example.

If the CTP detection value is higher than the value obtained by adding the given margin $\Delta T1$ to the Q1 estimated temperature (YES in step S22), it is considered that the CTP detection value is more influenced by the temperature of the diode D1 that is higher than the temperature of the IGBT device Q1. Therefore, the ECU 300 determines in step S23 that the amount of heat generation of the diode D1 is larger than that of the IGBT device Q1. In this case, it is considered that the CTP detection value indicates a value close to the temperature of the diode D1.

Therefore, the ECU 100 determines in step S24 whether the CTP detection value is equal to or higher than a protection temperature TD1 of the diode D1. If the CTP detection value is lower than the protection temperature TD1 of the diode D1 (NO in step S24), the ECU 100 finishes this cycle of the routine.

If the CTP detection value is equal to or higher than the protection temperature TD1 of the diode D1 (YES in step S24), the ECU 100 restricts the discharge power upper-limit value WOUT to a value that is lower by a given value than the current value, in step S25. In this manner, the discharge current of the battery 10 is restrained, and the amount of current passing through the diode D1 (the amount of heat generation of the diode D1) is reduced, so that overheating of the diode D1 is suppressed.

On the other hand, if the CTP detection value is equal to or lower than a value obtained by adding the given margin $\Delta T1$ to the Q1 estimated temperature (NO in step S22), it is considered that the CTP detection value is more influenced by the temperature of the IGBT device Q1 that is higher than the temperature of the diode D1. Therefore, the ECU 100 determines in step S26 that the amount of heat generation of the IGBT device Q1 is larger than that of the diode D1. In this case, it is considered that the CTP detection value indicates a value close to the temperature of the IGBT device Q1.

Therefore, the ECU 100 determines in step S27 whether the CTP detection value is equal to or higher than a protection temperature TQ1 of the IGBT device Q1. If the CTP detection value is lower than the protection temperature TQ1 of the IGBT device Q1 (NO in step S27), the ECU 100 finishes this cycle of the routine.

If the CTP detection value is equal to or higher than the protection temperature TQ1 of the IGBT device Q1 (YES in step S27), the ECU 100 restricts the charge power upper-limit value WIN to a value that is lower by a given value than the current value, in step S28. In this manner, the charge current of the battery 10 is restrained, and the amount of current passing through the IGBT device Q1 (the amount of heat generation of the IGBT device Q1) is reduced, so that overheating of the IGBT device Q1 is suppressed.

Figure 8:
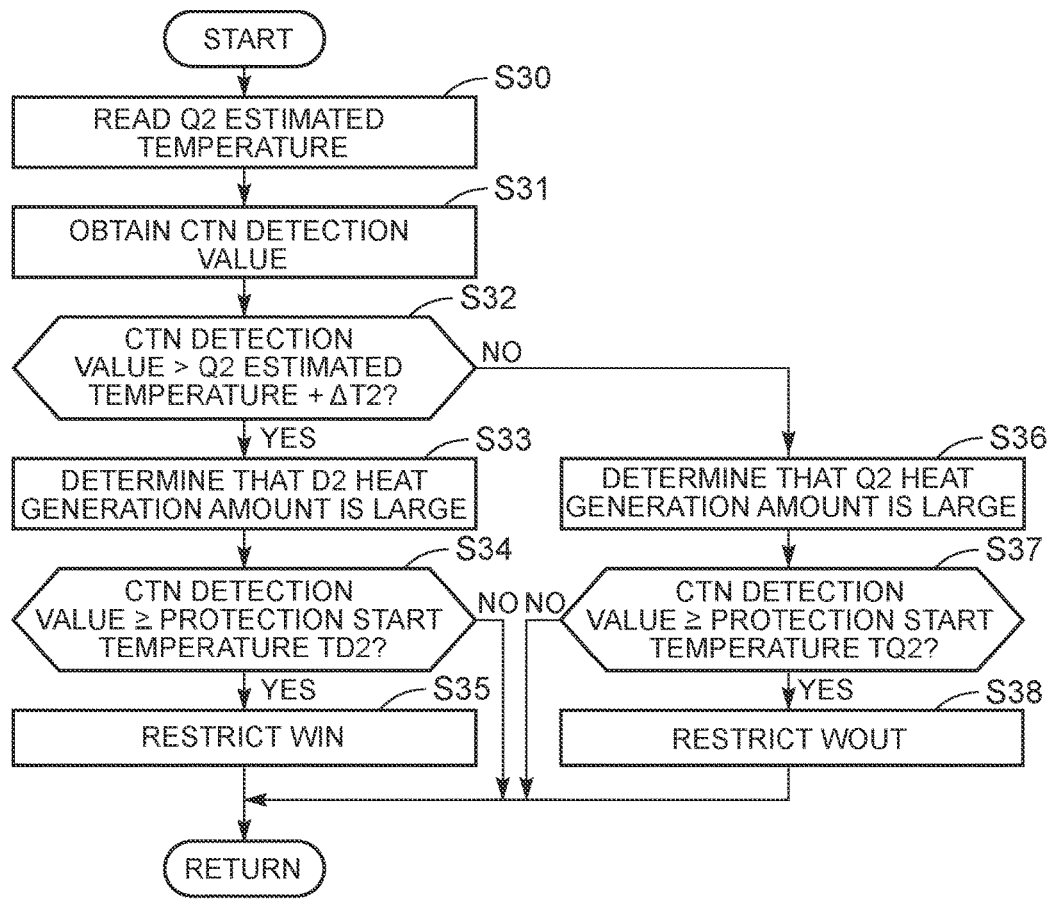
FIG. 8 is a flowchart illustrating one example of a control routine of the ECU.

FIG. 8 is a flowchart illustrating a control routine executed by the ECU 100 when it protects the lower arm 33 of the converter 30 from overheating. The routine of this flowchart is repeatedly executed at given intervals.

In step S30, the ECU 100 reads the Q2 estimated temperature calculated and stored in step S13 of FIG. 4 as described above, from the memory. In step S31, the ECU 100 obtains the CTN detection value from the temperature sensor 34.

In step S32, the ECU 100 determines whether the CTN detection value is higher than the Q2 estimated temperature. In this embodiment, it is determined whether the CTP detection value is higher than a value obtained by adding a given margin $\Delta T2$ to the Q2 estimated temperature, in view of an error of the Q2 estimated temperature, for example.

If the CTN detection value is higher than the value obtained by adding the given margin $\Delta T2$ to the Q2 estimated temperature (YES in step S32), it is considered that the CTN detection value is more influenced by the temperature of the diode D2 that is higher than the temperature of the IGBT device Q2. Therefore, the ECU 300 determines in step S33 that the amount of heat generation of the diode D2 is larger than that of the IGBT device Q2. In this case, it is considered that the CTN detection value indicates a value close to the temperature of the diode D2.

Therefore, the ECU 100 determines in step S34 whether the CTN detection value is equal to or higher than a protection temperature TD2 of the diode D2. If the CTN detection value is lower than the protection temperature TD2 of the diode D2 (NO in step S34), the ECU 100 finishes this cycle of the routine.

If the CTN detection value is equal to or higher than the protection temperature TD2 of the diode D2 (YES in step S34), the ECU 100 restricts the charge power upper-limit value WIN to a value that is lower by a given value than the current value, in step S35. In this manner, the charge current of the battery 10 is restrained, and the amount of current passing through the diode D2 (the amount of heat generation of the diode D2) is reduced, so that overheating of the diode D2 is suppressed.

On the other hand, if the CTN detection value is lower than a value obtained by adding a given margin $\Delta T2$ to the Q2 estimated temperature (NO in step S32), it is considered that the CTN detection value is more influenced by the temperature of the IGBT device Q2 that is higher than the temperature of the diode D2. Therefore, the ECU 100 determines in step S36 that the amount of heat generation of the IGBT device Q2 is larger than that of the diode D2. In this case, it is considered that the CTN detection value indicates a value close to the temperature of the IGBT device Q2.

Therefore, the ECU 100 determines in step S37 whether the CTN detection value is equal to or higher than a protection temperature TQ2 of the IGBT device Q2. If the CTN detection value is lower than the protection temperature TQ2 of the IGBT device Q2 (NO in step S37), the ECU 100 finishes this cycle of the routine.

If the CTN detection value is equal to or higher than the protection temperature TQ2 of the IGBT device Q2 (YES in step S37), the ECU 100 restricts the discharge power upper-limit value WOUT to a value that is lower by a given value than the current value, in step S38. In this manner, the discharge current of the battery 10 is restrained, and the amount of current passing through the IGBT device Q2 (the amount of heat generation of the IGBT device Q2) is reduced, so that overheating of the IGBT device Q2 is suppressed.

As described above, when the ECU 100 according to this embodiment protects the upper arm 31 from overheating, it calculates the Q1 estimated temperature, based on the control conditions of the converter 30, etc., and determines whether which of the amount of heat generation of the IGBT device Q1 and that of the diode D1 is larger, by comparing the CTP detection value with the Q1 estimated temperature. Then, the ECU 100 determines whether to restrict charge of the battery 10 or restrict discharge of the battery 10, according to the result of the above determination. Thus, overheating of the IGBT device Q1 of the upper arm 31 and overheating of the diode D1 are appropriately suppressed. The ECU 100 protects the lower arm 33 from overheating, in the same manner as is the case with the upper arm 31. As a result, in the case where the RCIGBTs are employed as the upper arm 31 and the lower arm 33 of the converter 30, overheating of the upper arm 31 and the lower arm 33 can be appropriately suppressed.

By appropriately suppressing overheating of the IGBT devices Q1, Q2 and overheating of the diodes D1, D2, it is possible to reduce the sizes of the IGBT devices Q1, Q2 and the diodes D1, D2, and reduce the size of the converter 30 as a whole.

In this embodiment, each IGBT device Q1, Q2 is not simply stopped, for the purpose of protection of the converter 30 from overheating; therefore, it is possible to cause electric current to keep flowing while restricting current in a direction in which the current needs to be restrained.

In the embodiment as described above, overheating of the IGBT device Q2 is suppressed by restricting the discharge power upper-limit value WOUT, in step S38 of FIG. 8. However, in step S38 of FIG. 8, the upper arm ON control of the converter 30 (control for constantly placing the IGBT device Q1 of the upper arm in the ON state, and constantly placing the IGBT device Q2 of the lower arm in the OFF state) may be performed, instead of restricting the discharge power upper-limit value WOUT. With the upper arm ON control thus performed, current flows through the diode D2, and no current flows through the IGBT device Q2, in the lower arm, so that overheating of the IGBT device Q2 can be more efficiently suppressed.

The embodiment disclosed herein should be considered as being exemplary and not restrictive in all respects. The scope of the disclosure is not defined by the above description, but defined by the appended claims, and is intended to include all changes within the range of the claims and equivalents thereof.

What is claimed is:

1. A power supply system configured to supply electric power to a load, the power supply system comprising:
   a battery;
   a first positive line connected to a positive electrode of the battery;
   a second positive line connected to a positive terminal of the load;
   a negative line connected between a negative terminal of the load and a negative electrode of the battery;
   a converter configured to perform voltage conversion between the battery and the load, the converter including
      a first switching device and a second switching device connected in series between the second positive line and the negative line, such that the first switching device is located closer to the second positive line than the second switching device, and the second switching device is located closer to the negative line than the first switching device,
      a first diode connected in antiparallel with the first switching device, the first switching device and the first diode constituting one chip,
      a second diode connected in antiparallel with the second switching device,
      a connection node connected to the first switching device, the second switching device, and the first positive line, and
      a reactor provided on the first positive line or on the negative line between the second switching device and the negative electrode of the battery;
   a temperature sensor configured to detect a temperature of the chip; and
   an electronic control unit configured to
      i) calculate a temperature estimated value of the first switching device from control conditions of the converter,
      ii) restrict a control upper-limit value of discharge power of the battery, when a detection value of the temperature sensor is higher than the temperature estimated value of the first switching device, and the detection value of the temperature sensor exceeds a protection temperature of the first diode, and
      iii) restrict a control upper-limit value of charge power of the battery, when the detection value of the temperature sensor is lower than the temperature estimated value of the first switching device, and the detection value of the temperature sensor exceeds a protection temperature of the first switching device.

2. The power supply system according to claim 1, wherein the power supply system being installed on a vehicle,
   the vehicle includes:
      a motor;
      a radiator;
      a water pump;
      a water channel that circularly connects an interior of the converter, the radiator, and the water pump in series; and
      a water temperature sensor configured to detect a temperature of a cooling water that flows through the water channel; and
   the electronic control unit is configured to
      i) calculate an estimated temperature difference between a temperature of the first switching device and the temperature of the cooling water detected by the water temperature sensor, based on at least one of information indicating whether the motor is in power running mode or the motor is in regenerative mode, amount of current passing through the converter, a boosting ratio of the converter, and a switching frequency, and
      ii) calculate the temperature estimated value of the first switching device, by adding the estimated temperature difference to the temperature of the cooling water detected by the water temperature sensor.

3. A power supply system configured to supply electric power to a load, the power supply system comprising:
   a battery;
   a first positive line connected to a positive electrode of the battery;
   a second positive line connected to a positive terminal of the load;
   a negative line connected between a negative terminal of the load and a negative electrode of the battery;
   a converter configured to perform voltage conversion between the battery and the load, the converter including
      a first switching device and a second switching device connected in series between the second positive line and the negative line, such that the first switching device is located closer to the second positive line than the second switching device, and the second switching device is located closer to the negative line than the first switching device,
a first diode connected in antiparallel with the first switching device, the first switching device and the first diode constituting one chip,
a second diode connected in antiparallel with the second switching device, the second switching device and the second diode constituting one chip,
a connection node connected to the first switching device, the second switching device, and the first positive line,
a reactor provided on the first positive line or on the negative line between the second switching device and the negative electrode of the battery;
a temperature sensor configured to detect a temperature of the chip; and
an electronic control unit configured to
i) calculate a temperature estimated value of the second switching device from control conditions of the converter,
ii) restrict a control upper-limit value of charge power of the battery, when a detection value of the temperature sensor is higher than the temperature estimated value of the second switching device, and the detection value of the temperature sensor exceeds a protection temperature of the second diode, and
iii) restrict a control upper-limit value of discharge power of the battery, when the detection value of the temperature sensor is lower than the temperature estimated value of the second switching device, and the detection value of the temperature sensor exceeds a protection temperature of the second switching device.

4. The power supply system according to claim 3, wherein the power supply system being installed on a vehicle,
the vehicle includes:
a motor;
a radiator;
a water pump;
a water channel that circularly connects an interior of the converter, the radiator, and the water pump in series; and
a water temperature sensor configured to detect a temperature of a cooling water that flows through the water channel, and
the electronic control unit is configured to
i) calculate an estimated temperature difference between a temperature of the second switching device and the temperature of the cooling water detected by the water temperature sensor, based on at least one of information indicating whether the motor is in power running mode or the motor is in regenerative mode, amount of current passing through the converter, a boosting ratio of the converter, and a switching frequency, and
ii) calculate the temperature estimated value of the second switching device, by adding the estimated temperature difference to the temperature of the cooling water detected by the water temperature sensor.

5. A power supply system configured to supply electric power to a load, the power supply system comprising:
a battery;
a converter configured to perform voltage conversion between the battery and the load, the converter including
a switching device,
a diode connected in antiparallel with the switching device, the switching device and the diode constituting one chip;
a temperature sensor configured to detect a temperature of the chip; and
an electronic control unit configured to
i) calculate a temperature estimated value of the switching device from control conditions of the converter,
ii) restrict a control upper-limit value of charge power or discharge power of the battery, when a detection value of the temperature sensor is higher than the temperature estimated value of the switching device, and the detection value of the temperature sensor exceeds a protection temperature of the diode, and
iii) restrict a control upper-limit value of charge power or discharge power of the battery, when the detection value of the temperature sensor is lower than the temperature estimated value of the switching device, and the detection value of the temperature sensor exceeds a protection temperature of the switching device.

6. The power supply system according to claim 5, wherein the power supply system being installed on a vehicle,
the vehicle includes:
a motor;
a radiator;
a water pump;
a water channel that circularly connects an interior of the converter, the radiator, and the water pump in series; and
a water temperature sensor configured to detect a temperature of a cooling water that flows through the water channel, and
the electronic control unit is configured to
i) calculate an estimated temperature difference between a temperature of the switching device and the temperature of the cooling water detected by the water temperature sensor, based on at least one of information indicating whether the motor is in power running mode or the motor is in regenerative mode, amount of current passing through the converter, a boosting ratio of the converter, and a switching frequency, and
ii) calculate the temperature estimated value of the switching device, by adding the estimated temperature difference to the temperature of the cooling water detected by the water temperature sensor.

* * * * *